United States Patent [19]
Rocher et al.

[11] Patent Number: 5,476,685
[45] Date of Patent: Dec. 19, 1995

[54] PROCESS FOR THE MANUFACTURE OF A FIBER REINFORCED COMPOSITE MATERIAL HAVING A CERAMIC MATRIX AND PREHEATED CARBON FIBERS

[75] Inventors: Jean-Philippe Rocher, Saint-Medard-en-Jalles; Jean-Claude Cavalier, Le Pian Medoc; Jean-Luc Laquet, Bordeaux, all of France

[73] Assignee: Societe Europeenne de Propulsion, Suresnes, France

[21] Appl. No.: 171,187

[22] Filed: Dec. 21, 1993

Related U.S. Application Data

[63] Continuation of Ser. No. 652,200, Feb. 7, 1991, abandoned.

[30] Foreign Application Priority Data

Feb. 9, 1990 [FR] France .................................. 90 01563

[51] Int. Cl.$^6$ .................................................. C23C 16/02
[52] U.S. Cl. .................... 427/249; 427/255.7; 427/248.1; 427/314
[58] Field of Search ..................... 427/314, 316, 427/248.1, 249, 255.7

[56] References Cited

U.S. PATENT DOCUMENTS

| | | | |
|---|---|---|---|
| 4,397,901 | 8/1983 | Warren | 427/249 |
| 4,752,503 | 6/1988 | Thebault | 427/248.1 |
| 4,766,013 | 8/1988 | Warren | 427/255.7 |
| 5,045,356 | 9/1991 | Uemura et al. | 427/428.1 |

FOREIGN PATENT DOCUMENTS

| | | |
|---|---|---|
| 0121797 | 10/1984 | European Pat. Off. . |
| 0172082 | 2/1986 | European Pat. Off. . |
| 56-63013 | 5/1981 | Japan . |
| 62-257424 | 11/1987 | Japan . |
| 2081695 | 2/1982 | United Kingdom . |

OTHER PUBLICATIONS

World Patent Index (Latest), accession No. 82–66381E, Derwet Publications Ltd. Londres, B. G. & BG–A–2,092, 119 (General Electric Co.) Nov. 8, 1982.

Journal of Materials Science, "Thermal Diffusivity of Chemically Vapour Deposited Silicon Carbide Reinforced with Silicon of Carbon Fibres", vol. 20, No. 9, Sep. 1985, pp. 3201–3212.

*Primary Examiner*—Shrive Beck
*Assistant Examiner*—Katherine A. Bareford
*Attorney, Agent, or Firm*—Weingarten, Schurgin, Gagnebin & Hayes

[57] ABSTRACT

In a process according to the invention, before a carbon/fiber ceramic matrix is densified, the carbon fiber reinforcement material is subjected to a thermal treatment in a non-oxidizing environment at a temperature greater than 1300° C. and less than 2200° C., to act on the bonding between the fibers and the matrix. If a preform of the carbon fiber reinforcement material is formed prior to densification by a matrix, then the thermal treatment may be performed on the preform, prior to densification by the matrix. If the matrix is densified by chemical vapor infiltration inside a furnace, then the thermal treatment may be performed inside the infiltration furnace prior to the densification. The thermal treatment achieves a significant improvement in the strength of the resulting composite material.

4 Claims, No Drawings

PROCESS FOR THE MANUFACTURE OF A FIBER REINFORCED COMPOSITE MATERIAL HAVING A CERAMIC MATRIX AND PREHEATED CARBON FIBERS

RELATED APPLICATION

This application is a continuation of application Ser. No. 07/652,200, filed Feb. 7, 1991, now abandoned.

FIELD OF THE INVENTION

The present invention relates to composite materials having a carbon fiber based reinforcement densified by a ceramic matrix.

BACKGROUND OF THE INVENTION

Carbon fibers are used to form reinforcement textures in thermo-structural ceramic matrix composite (CMC) materials. The latter have properties that make them particularly apt to withstand large mechanical stresses at high temperatures. They are composed of a ceramic matrix deposited within the porous structure of a fibrous reinforcement, e.g. by chemical vapor deposition.

The manufacture of these materials is well known in the art. Specifically, a fibrous reinforcement made of carbon is used to construct a preform of a workpiece to be manufactured, either by winding fibers or yarns, or by piling one-dimensional-layers (plies of yarn or cable), or two-dimensional-layers (cloth or felt), possibly linked together by needling, or by three-dimensional weaving of fibers or yarns. The fibrous reinforcement, which may be held in shape by an appropriate tooling, is then densified by the matrix material. This densification can be achieved by liquid phase impregnation, using a matrix precursor, followed by a thermal treatment leaving behind a deposit of matrix material on the fibers within the reinforcement. Several impregnation cycles are generally necessary to obtain the required degree of densification. Densification can also be obtained by chemical vapor infiltration inside an infiltration furnace.

Many processes have been suggested for improving the behavior of such composite materials, especially their mechanical strength and oxidation resistance. In particular, a significant improvement in mechanical strength can be obtained by depositing, between the fibers of the reinforcement texture and the ceramic matrix, a think intermediate coating having a laminar structure, e.g. a layer of laminar pyrolytic carbon or boron nitride. Such a process is disclosed in document EP-A-0 172 082.

The present invention aims to provide a process yielding a substantial improvement in the properties of such composite materials, and in particular an increase in tensile strength and creep strength.

SUMMARY OF THE INVENTION

According to the invention, the above aim is achieved by submitting the carbon fiber reinforcement material, prior to densification by the matrix, to a thermal treatment in a non-oxidizing environment at a temperature greater than 1300° C. and less than 2200° C.

As will appear from the test results given below, such a thermal treatment makes it possible to obtain a composite material having improved mechanical strength, in particular better tensile and creep strength.

The present invention has particular applications in thermo-structural carbon fiber reinforced CMC materials.

DESCRIPTION OF THE PREFERRED EMBODIMENT

The present invention also aims to improve the mechanical strength of the composite material by performing a heat treatment of the carbon fiber reinforcement in a non-oxidizing environment.

The heat treatment is carried out on the carbon fiber reinforcement either before or after making the fibrous reinforcement preform, but always before deposition of the ceramic matrix material. It can be carried out before or after depositing the material that forms the intermediate coating applied on the carbon fibers and interfacing with the ceramic matrix.

The thermal treatment is carried out at a temperature exceeding 1300° C. As for the upper temperature bound, the value of 2200° C. is chosen to limit the graphitization of the fibers.

The heat treatment is naturally carried out in a non-oxidizing medium, e.g. in a nitrogen atmosphere or in a vacuum, and preferably lasts for at least 30 minutes. This duration is however dependent on the treatment temperature and could be made less than 30 minutes if the latter is sufficiently high.

If the thermal treatment is carried out on the fibrous preform prior to densification by chemical vapor deposition, it could be advantageously performed in the infiltration furnace, before injection of the gas or gaseous mixture producing the interphase or matrix material.

It has already been proposed in document EP-A-O 121 797 to perform a thermal treatment on a carbon fiber substrate, prior to densifying the latter with a matrix. However, the thermal treatment is carried out at a temperature which, in the examples given in EP-A-O 121 797, is 2300° F. (about 1250° C.) at the most. Moreover, the purpose of such treatment is to obtain thermal stabilization of the substrate, and the duration of the treatment is not specified except to state that it should be sufficient to thermally stabilize the substrate.

Besides, one feature of the materials obtained by the process described in EP-A-O 121 797 is that the carbon fibers of the substrate are free to move within the matrix. The absence of bonds between the fibers and the matrix can indeed lead to a high degree of toughness and shock resistance, by preventing cracks propagating in the matrix from attacking and breaking the fibers. However, this absence of bonding means that virtually no load can be transferred from the matrix to the fibers, and thus a high tensile strength is impossible to achieve.

In the process according to the present invention, the thermal treatment is carried out at a temperature of between 1300° and 2200° C., and serves to improve the mechanical strength of the composite material obtained once the substrate is densified.

The aim of the present invention is not to achieve a thermal stabilization of the substrate or a dimensional stabilization of the substrate's fibers. As can be seen from the examples that follow, the thermal treatment performed in accordance with the present invention acts on the fiber-matrix bond. It is also found to increase the mechanical strength of composite materials even when applied to high Young's modulus carbon fiber substrates that have previously been subjected to high temperatures during their manufacture and are already dimensionally stabilized.

It has already been proposed in document GB-A-2 092 119 to carry out a thermal treatment on graphite fibers incorporated in a material. However, the object of the process disclosed is to produce a material having specific abrasive properties, formed of diamond crystals or cubic boron nitride crystals, graphite fibers, silicon carbide and silicon. The material is obtained by liquid silicon infiltration into a mixture containing the crystals and the graphite fibers and carbon (or carbon precursor). The thermal treatment is conducted in a vacuum to outgas the impurities adsorbed on the fibers, in order to increase their liquid silicon wettability. Moreover, the graphite fibers are in the form of short fibers (or whiskers) whose presence is essentially to enhance the silicon wettability, and not to form a fibrous substrate serving as a reinforcement, as in the composite materials of the present invention.

There shall now be given a number of examples explaining the implementation of the present invention.

EXAMPLE 1

Composite material samples of the 2D-C/SiC (two-dimensional carbon fiber reinforcement and silicon carbide matrix) type are obtained by a process comprising the following steps:

creating a preform by piling flat plies of a cloth of carbon fibers commercially available under the reference "T300" by Toray of Japan (fibers from a polyacrylonitrile (PAN) precursor), holding the preform in an adapted tool, thermally treating the preform, forming on the fibers an intermediate coating of laminar pyrolytic carbon by chemical vapor infiltration, densifying the preform, together with its intermediate coating, by chemical vapor infiltration of the silicon carbide (SiC) constituting the ceramic matrix material.

A process of the above type, with the exception of the thermal treatment of the cloth, is described in patent EP 172 082.

Table 1 gives the results of tests conducted on samples A to F obtained in accordance with the above method, but under different thermal treatment conditions. For a comparison, the same tests were performed on a sample G, obtained by the same method except for the thermal treatment step. The measured values are : the density d of the composite material, ultimate tensile strength $\delta R$, breaking strain $\epsilon R$, Young's modulus E and inter-laminar shear resistance $\delta 13$.

C. and 2000° C. respectively.

Sample E was obtained using a preform having been submitted to a thermal treatment at 1600° C. under vacuum for 10 hours. Sample F was obtained using a preform submitted to a thermal treatment in nitrogen (atmospheric pressure) at 1600° C. for 30 minutes.

Compared to sample G, all samples A to F exhibited increased ultimate tensile strength $\delta R$ (by between 29% and 40%), Young's modulus E and inter-laminar shear resistance $\sigma 13$.

An increase in breaking strain $\epsilon R$ was also observed, except for sample D (treatment at 2000° C.).

A comparison of results obtained on samples B and E seems to indicate that a thermal treatment of 10 hours (instead of 30 minutes) increases the Young's modulus E (raising the treatment temperature produces the same effect, but does not make any significant change as regards breaking strain).

Morphological studies were conducted on the samples after the ultimate tensile strength tests using a scanning electron microscope and a transmission electron microscope. In the materials whose preforms were obtained in accordance with the present invention, it was found that the break occurs at the interface between the fibers and the pyrolytic carbon intermediate coating. In contrast, it was observed that the break in sample G occurs between the intermediate pyrolytic carbon coating and the silicon carbide matrix or within the intermediate coating.

This means that the thermal treatment in accordance with the present invention modifies the fiber-matrix bond in C/SiC type composite materials having an intermediate pyrolytic carbon coating, and that the tensile characteristics of the composite material are significantly improved. Even if the break occurs at the fiber-matrix interface, it is clear that this does not imply that the fibers are free to move relative to the matrix, as this would be inconsistent with the noted increase in tensile strength.

Expansion measurements were conducted on samples A and G. It appeared from these measurements that the residual dimension variations are the same, which indicates that the thermal treatment carried out on the preform of sample A has no incidence on the dimensional stabilization of the fibers.

EXAMPLE 2

Two samples H and I of 2D-C/SiC type composite material were obtained as in example 1, using a cloth made from carbon fibers sold under the reference "T300" by Toray of Japan. When in its preform stage, the cloth was submitted to the following thermal treatment under vacuum:

TABLE 1

| Sample | Preform T (°C.) | treatment duration | atm. | d | $\delta R$ (MPa) | $\epsilon R$ (%) | E (GPa) | $\delta 13$ (MPa) |
|---|---|---|---|---|---|---|---|---|
| A | 1 400 | 30 min | vacuum | 1.9 | 490 | 0.93 | 98 | 20 |
| B | 1 600 | 30 min | vacuum | 1.9 | 480 | 0.83 | 99 | 16 |
| C | 1 800 | 30 min | vacuum | 1.93 | 490 | 0.74 | 106 | 17 |
| D | 2 000 | 30 min | vacuum | 1.93 | 450 | 0.62 | 109 | 17 |
| E | 1 600 | 10 h | vacuum | 1.9 | 480 | 0.81 | 107 | 19.5 |
| F | 1 600 | 30 min | $N_2$ | 1.9 | 460 | 0.86 | 97 | 21 |
| G | — | — | — | 1.9 | 350 | 0.66 | 82 | 14 |

Samples A to D were obtained from cloths having been submitted, in the preform stage, to a thermal treatment under vacuum (i.e. a pressure of about 0.1 torr or 13.3 N/m$^2$) for 30 minutes, at temperatures of 14000° C., 1600° C., 1800°

1200° C. during 30 minutes for sample H;

800° C. during 30 minutes for sample I.

Table 2 below gives the values of d, δR, εR and E measured p, on samples H and I.

TABLE 2

| Sample | Preform T (°C.) | treatment duration | atm. | d | δR (MPa) | εR (%) | E (GPa) |
| --- | --- | --- | --- | --- | --- | --- | --- |
| H | 1 200 | 30 min | vacuum | 1.93 | 360 | 0.70 | 80 |
| I | 800 | 30 min | vacuum | 1.91 | 355 | 0.68 | 78 |

Comparison of the results obtained from samples H and I with those obtained from sample G (table 1) indicates that there is no marked improvement in the mechanical characteristics.

EXAMPLE 3

A sample J of 2D-C/SiC type composite material was obtained as in example 1, using a cloth made from carbon fibers sold under the reference "HTA 7" by Toho of Japan. When in its preform stage, the cloth was submitted to a thermal treatment at 1600° C. under vacuum during 30 minutes. For comparison, a sample K was made under the same conditions except for the thermal treatment of the preform.

Table 3 below gives the values of d, δR, εR, and E measured on samples J and K.

TABLE 3

| Sample | Preform T (°C.) | treatment duration | atm. | d | δR (MPa) | εR (%) | E (GPa) |
| --- | --- | --- | --- | --- | --- | --- | --- |
| J | 1 600 | 30 min | vacuum | 1.94 | 420 | 0.81 | 91 |
| K | — | — | — | 1.94 | 300 | 0.58 | 71 |

It is clearly apparent that the thermal treatment brings a very large improvement.

EXAMPLE 4

A sample L of 2D-C/SiC type composite material was obtained as in example 1, using a cloth made of carbon fibers sold under the reference "M40" by Toray of Japan. The preform was submitted to a thermal treatment at 1400° C. under vacuum. For comparison, a sample M was made under the same conditions except for the thermal treatment of the preform.

Table 4 below gives the values of d, δR, εR and E measured on samples L and M.

It will be noted that even with cloth made from "M40" fibers (high Young's modulus fibers manufactured at temperatures exceeding 2200° C., and thus dimensionally stabilized), a thermal treatment at 1400° C. brings a clear improvement in the tensile strength and breaking strain of 2D-C/SiC materials with a laminar pyrolytic carbon interphase.

TABLE 4

| Sample | Preform T (°C.) | treatment duration | atm. | d | δR (MPa) | εR (%) | E (GPa) |
| --- | --- | --- | --- | --- | --- | --- | --- |
| L | 1 400 | 30 min | vacuum | 1.94 | 350 | 0.53 | 76 |
| M | — | — | — | 1.96 | 250 | 0.35 | 95 |

EXAMPLE 5

A sample N of 2D-C/SiC type composite material was obtained as in example 1, using a cloth made of carbon fibers sold under the reference "T300" by Toray of Japan. The preform was submitted to a thermal treatment at 1600° C. under 0.1 torr (13.3 N/m$^2$) during 30 minutes. For comparison, a sample P was made under the same conditions except for the thermal treatment of the preform.

These materials are characterized by a creep under tensile strength at 1500° C. Sample N exhibited a strain of 0.23% after 2.5 hours under a load of 250 MPa. Under the same conditions, the strain of sample P was measured to be 0.45%.

The thermal treatment thus Leads to a notable improvement in creep resistance.

In the above examples, the thermal treatment is conducted on a preform made of cloth plies held in an adapted tool.

The treatment may of course be conducted on the carbon fiber cloth prior to making the preform, or even before the plies are cut out, for instance on a roll of cloth, as shown in example 6.

EXAMPLE 6

A sample Q of 2D-C/SiC type composite was obtained by a process comprising the following steps:
 thermally treating a roll of cloth of carbon fibers commercially available under the reference "T300" by Toray of Japan, the thermal treatment being performed at 1600° C. under vacuum during 30 minutes;
 creating a preform by piling flat plies of the thus treated cloth;
 holding the preform in a tool;
 forming on the fibers an intermediate coating of pyrolytic carbon by chemical vapor infiltration;
 densifying the preform, together with its intermediate coating, by chemical vapor infiltration of silicon carbide constituting the ceramic matrix.

The values of δR, εR and E measured on sample Q are identical to those measured on sample B in example 1, the only difference between the processes carried out for obtaining samples Q and B being that, for sample Q, the thermal treatment is performed on the roll of cloth whereas, for example B, the thermal treatment is carried out on the preform consituted by the piled cloth plies.

EXAMPLE 7

A sample R of 2D-C/C-SiC type composite material was obtained by a process comprising the following steps:

creating a preform by piling flat plies of cloth of carbon fibers commercially available under the reference "T300" by Toray of Japan;

holding the preform in an adapted tool;

thermally treating the preform at 1600° C. under vacuum (i.e. under a pressure of about 0.1 torr or 13.3 N/m$^2$, during 30 minutes);

partially densifying the preform by chemical vapor infiltration of carbon, the amount of carbon deposited being 30% by volume;

terminating the densification of the already partially densified preform, by chemical vapor infiltration of silicon carbide, the amount of silicon carbide deposited being 10% by volume. After this further densification, the residual porosity of the material is between 10% and 15%.

For comparison, a sample S was made under the same conditions, except for the thermal treatment of the preform.

Table 5 shows the values of d, δR, εR and E measured on samples R and S.

TABLE 5

| Sample | Preform T (°C.) | treatment duration | atm. | d | δR (MPa) | εR (%) | E (GPa) |
|---|---|---|---|---|---|---|---|
| R | 1 600 | 30 min | vacuum | 1.70 | 370 | 0.58 | 68 |
| S | — | — | — | 1.74 | 390 | 0.71 | 60 |

It will be noted that in contrast with C/SiC materials with a PyC interphase, the thermal treatment yields no improvement at the level of tensile resistance and breaking strain for materials having a two-phased C-SiC matrix. This can be accounted for by the fact that the load transfer between the fibers and the matrix is different depending on whether the matrix is of the C or SiC type.

EXAMPLE 8

A sample T of 2D-C/SiC type composite material was obtained by a process comprising the following steps:

creating a preform by flat plies of carbon fiber cloth commercially available under the reference "T300" by Toray of Japan;

holding the preform in an adapted tool;

forming on the fibers an intermediate coating of laminar pyrolytic carbon by chemical vapor infiltration;

thermally treating the thus coated preform under vacuum;

densifying the preform by chemical vapor infiltration of the silicon carbide matrix material.

A process of the above type, with the exception of the thermal treatment step, is described in document EP-A-O 172 082.

Table 6 below shows the values of d, δR, εR and measured on samples T and recapitulates the results obtained with sample G from example 1 using a prior art process.

TABLE 6

| Sample | Preform T (°C.) | treatment duration | atm. | d | δR (MPa) | εR (%) | E (GPa) |
|---|---|---|---|---|---|---|---|
| T | 1 600 | 150 min | vacuum | 2.0 | 420 | 0.82 | 92 |
| G | — | — | — | 1.9 | 350 | 0.66 | 82 |

From table 6, it is apparent that also when performed on a preform having previously received a coating of interphase material (pyrolytic carbon), the thermal treatment brings about a marked improvement in the mechanical characteristics of the composite material.

In the foregoing examples, the ceramic material as well as the intermediate coating (pyrolytic carbon interphase) were implemented by chemical vapor infiltration. The inventive process is also applicable in instances where the matrix and/or the carbon interphase are implemented by a liquid process.

EXAMPLE 9

A sample U of 2D-C/SiC type composite material was obtained by a process comprising the following steps:

thermally treating a roll of carbon fibers commercially available under the reference "T300" by Toray of Japan;

impregnating a cloth made from the treated fibers with a phenolic resin;

shaping the impregnated cloth in an adapted tool;

pyrolizing the resin, so producing a resin coke surrounding the carbon fibers—this produces an intermediate coating that has a volume ratio (percentage of the preform's total apparent volume occupied by the interphase) close to that obtained with laminar pyrolytic carbon deposited by chemical vapor infiltration in the previous examples;

densifying the preform, together with its resin coke intermediate coating, by chemical vapor infiltration of the silicon carbide matrix material.

Table 7 below shows the values of δR, εR and E measured on sample U. For comparison, the same tests were performed on a sample V obtained by the same method except for the thermal treatment.

TABLE 7

| Sample | Preform T (°C.) | treatment duration | atm. | δR (MPa) | εR (%) | E (GPa) |
|---|---|---|---|---|---|---|
| U | 1 400 | 30 min | vacuum | 240 | 0.43 | 84 |
| V | — | — | — | 60 | 0.1 | 65 |

There again, the thermal treatment grants a clear improvement in the composite material's mechanical properties. For sample U, these are nevertheless inferior when compared with sample A of example 1, the intermediate carbon coating obtained by a liquid process having a lesser effect that that obtained by chemical vapor infiltration.

The foregoing examples give clear evidence of the improvement in the mechanical properties of ceramic matrix composite materials, especially as regards tensile strength at ambient temperature and creeping at high temperature, resulting from the thermal treatment of the carbon fiber reinforcement.

The considerable superiority of the test results obtained with ceramic matrix composites according to the invention compared to those obtained without thermal treatment, even when using high Young's modulus fibers (i.e. fibers having been submitted to high temperatures in their manufacture) indicate that the improvement occurs not at the level of the fibers themselves, but rather at the level of the fiber-matrix (or fiber-interphase) bond.

What is claimed is:

1. A process for the manufacture of a carbon/ceramic composite material having carbon fibers densified by a ceramic matrix material, said process comprising the steps of:

providing matrix-free carbon fibers, wherein said matrix-free carbon fibers have previously been heated and cooled;

heating said matrix-free carbon fibers by subjecting the matrix-free carbon fibers to a thermal treatment in a non-oxidizing environment at a temperature greater than 1300° C. and less than 2200° C. to provide thermally treated matrix-free carbon fibers;

forming an intermediate coating on said thermally treated matrix-free carbon fibers by chemical vapor infiltration to provide thermally heated coated matrix-free carbon fibers; and as the next processing step, densifying the thermally treated coated matrix-free carbon fibers by depositing the ceramic matrix material about and in contact with the thermally treated coated matrix-free carbon fibers to provide thermally treated coated matrixed carbon fibers.

2. The process of claim 1, according to which a preform of said matrix-free carbon fibers is formed prior to densification by said matrix material, wherein said thermal treatment is performed on said preform prior to densification by said matrix material.

3. The process of claim 1, according to which a preform including said thermally treated coated matrix-free carbon fibers is formed by means of a carbon fiber based material prior to densification by said matrix material, wherein said thermal treatment is performed on said carbon fiber based material constituting said preform, before said preform is formed.

4. The process of claim 1, wherein said step of forming an intermediate coating includes depositing pyrolytic carbon on said matrix-free carbon fibers.

* * * * *